United States Patent [19]

Kendall et al.

[11] 4,154,568

[45] May 15, 1979

[54] CATALYTIC COMBUSTION PROCESS AND APPARATUS

[75] Inventors: Robert M. Kendall, Sunnyvale; John P. Kesselring, Mountain View, both of Calif.

[73] Assignee: Acurex Corporation, Mountain View, Calif.

[21] Appl. No.: 799,948

[22] Filed: May 24, 1977

[51] Int. Cl.² ............................................. B01J 29/00
[52] U.S. Cl. .......................................... 431/7; 431/328
[58] Field of Search ................... 431/7, 170, 328, 329; 23/277 C

[56] References Cited

U.S. PATENT DOCUMENTS

| | | | |
|---|---|---|---|
| 3,928,961 | 12/1975 | Pfefferie | 431/7 X |
| 4,054,418 | 10/1977 | Miller | 23/277 C |

*Primary Examiner*—Alan Cohan
*Attorney, Agent, or Firm*—Flehr, Hohbach, Test, Albritton & Herbert

[57] ABSTRACT

Combustion process and apparatus which includes a monolith bed through which a mixture of fuel and oxidizer reactants is directed. The initial segment of the bed is formed with cells of an optimum size for causing the reactants to undergo heterogeneous combustion without blowout. One or more downstream segments of the bed are formed with cells of a size smaller than the upstream cells to achieve substantially complete combustion in a bed of relatively compact dimensions. High mass flow rates are obtained under stable combustion conditions with high combustion efficiency and low emissions.

11 Claims, 6 Drawing Figures

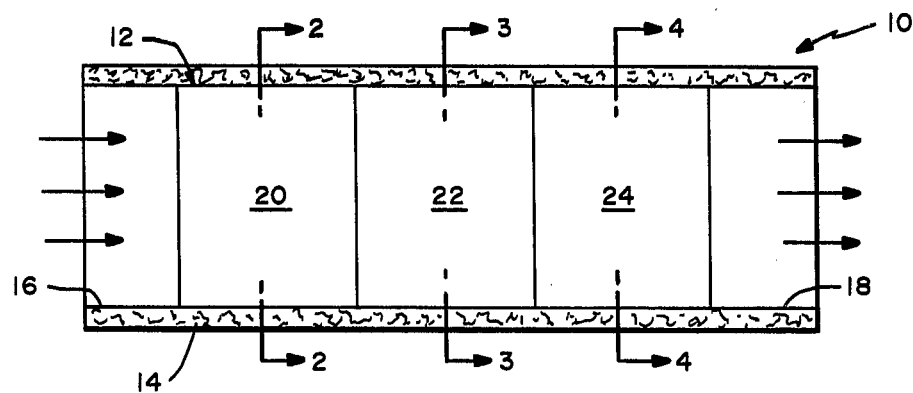
FIG.—1
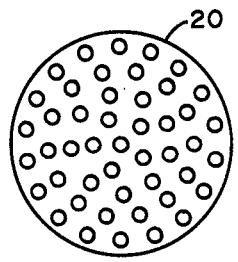
FIG.—2
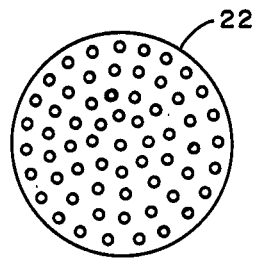
FIG.—3
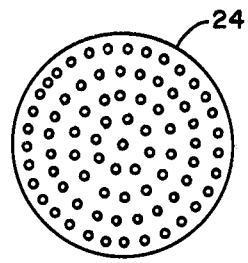
FIG.—4
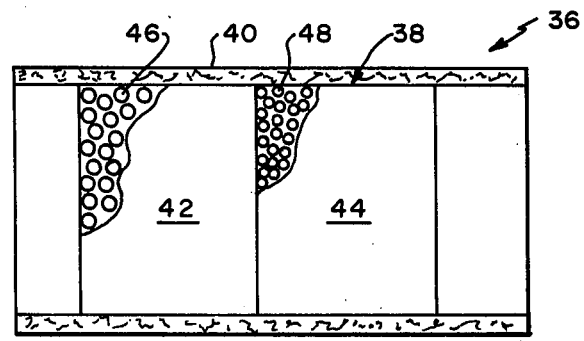
FIG.—6
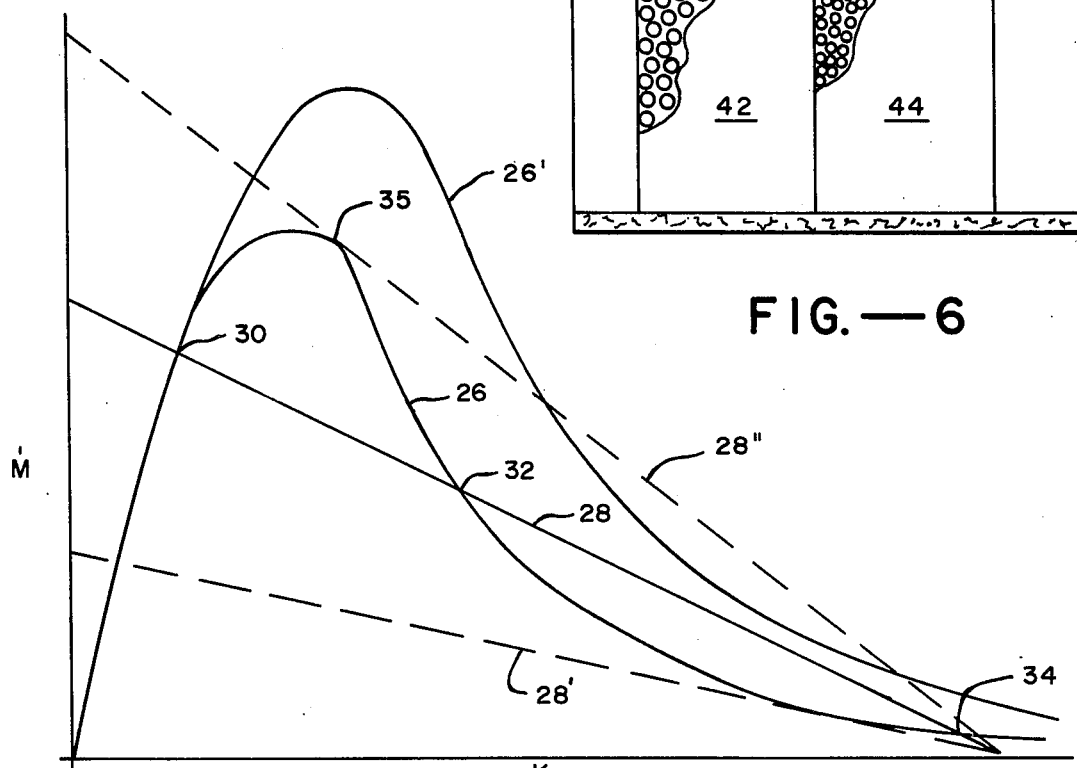
FIG.—5

CATALYTIC COMBUSTION PROCESS AND APPARATUS

BACKGROUND OF THE INVENTION

This invention relates in general to catalytic combustion apparatus and processes, e.g., stationary source combustors, including gas turbines and industrial boilers, as well as mobile combustors.

Catalytic combustors have previously been provided which incorporate monolith beds. One such prior art combustor is shown in U.S. Pat. No. 3,928,961 to Pfefferle. In the Pfefferle patent a relatively small cell size monolith bed is incorporated such that both heterogenous and gas-phase reactions are initiated near the bed entrance, but also resulting in blowout at relatively low mass flow rates.

U.S. Pat. No. 3,155,142 to Stack discloses another prior art combustor incorporating a feed plate, combustion plate, and radiation plate. The patent describes that the feed plate prevents flash back into the inlet stream and that the radiation plate promotes flash back into the combustion zone while protecting the combustion zone against external interference, such as from wind.

With prior art combustors low mass flow rates must be maintained to avoid a blow-out condition and to achieve acceptable fuel conversion efficiency. It would be desirable to provide a system operating under stable combustion conditions and which would also give relatively higher mass flow rates with greater efficiency and lower emissions.

OBJECTS AND SUMMARY OF INVENTION

It is a general object of the invention to provide new and improved process and apparatus for the catalytic combustion of fuel.

It is another object to provide combustion process and apparatus of the type described which operates at a relatively high mass flow rate and high efficiency for a given overall size.

Another object is to provide combustion process and apparatus of the type described in which the high mass flow rate is maintained without blowout and in which the reactants undergo substantially complete combustion with low emissions.

The invention in summary includes process and apparatus incorporating a combustor having a monolith bed divided into segments of graded cell size. Fuel and oxidizer reactants are directed into the initial segment of cells of a large size which is optimum to cause stable, self-sustained heterogeneous combustion of the reactants. The reactants are directed through one or more downstream bed segments having cells which are progressively smaller than the upstream cells. The smaller-sized downstream cells provide a large number of transfer units for the entire bed whereby substantially complete combustion is achieved in a relatively compact bed length.

The foregoing and additional objects and features of the invention will appear from the following description in which the several embodiments have been set forth in detail in conjunction with the accompanying drawings.

BRIEF DESCRIPTION OF THE DRAWINGS

FIG. 1 is a longitudinal section view of a combustor incorporating the invention.

FIG. 2 is a cross-sectional view taken along the line 3—3 of FIG. 1.

FIG. 4 is a cross-sectional view taken along the line 4—4 of FIG. 1.

FIG. 5 is a graph illustrating mass flux equations for a typical bed segment of the invention.

FIG. 6 is a longitudinal section view of another embodiment of the invention.

DESCRIPTION OF THE PREFERRED EMBODIMENTS

In the drawings, FIG. 1 illustrates generally at 10 combustor apparatus according to one embodiment of the invention. The invention will find application in a wide range of combustion processes, such as stationary source combustion devices, e.g., gas turbines and industrial boilers, as well as certain mobile combustion devices. The process and apparatus of the invention is applicable to combusting an oxidizer with a wide range of fuels, e.g., natural gas, propane, indolene, methanol and other solid, liquid and gaseous fuels.

Combustor 10 comprises a segmented monolith bed 12 which is enclosed by a housing or jacket 14 comprised of a suitable insulating material. The bed and insulating jacket are illustrated as circular in cross-section, although they could be formed in other configurations. A mixture of the fuel and oxidizer is directed into the bed through a conduit, not shown, connected at the upstream end 16 of the jacket. The discharging reaction products are directed from the bed into another conduit, not shown, connected at the downstream end 18 of the jacket.

Monolith bed 12 is divided into a plurality, shown as three, of segments 20, 22, 24 positioned in series along the flow stream. Each bed segment comprises a large plurality of cells which form flow passages having surface-active walls for causing the reactants in the stream to undergo heterogenous combustion. The cross-sectional profiles of the cells in the three segments of combustor 10 are illustrated as circular, although they could be square, honeycomb or other similar geometric shapes.

The surfaces of the cells have a high surface activity for maximizing heterogenous reactions. This surface activity is achieved by surface coating with a suitable catalyst, e.g., metals such as Pt or Pd; a multimetalic such as Pt-Pd, Pt-Co, Pt-Rh; oxides such as $Co_3O_4$, NiO, $MnO_2$; mixed oxides such as $LaCoO_3$; $CuCr_2O_4$, $ThO_2.CeO_2$; and mixed systems such as $Pt/Co_3O_4$ or $Pt/ThO_2.CeO_2$. As required the catalyst can be supported on a suitable washcoat such as $\gamma Al_2O_3$. The particular type of catalyst employed would depend upon the operating conditions and requirements for the desired combustion process.

The cell size for the individual bed segments is predetermined in accordance with the invention to achieve, in a relatively compact unit, high mass throughput and large volumetric heat release rate under stable combustion conditions, with efficient conversion of the reactants, and low emissions.

The predetermined cell size for the bed segments is selected for particular operating conditions according to mass transport balance calculations. During steady state operation the combustion process includes the introduction of premixed fuel and oxidizer, e.g., air, into the combustor. The gases diffuse to the cell wall and heterogenously react on the active sites and within the surface. Heat is generated and transferred by conduction, radiation and convection. Part of this heat is transferred to the main flow of gases to thermally support homogeneous reactions. Surface reaction products diffuse back to the main flow of gases and are carried downstream.

If the heat release rate due to reactions at the surface is sufficiently large compared to the convective, conductive and radiative heat losses, then the catalyst bed will operate in the "hot" mode. This mode of operation gives significant fuel conversion whose magnitude is primarily controlled by mass transfer to the surface. However, if the surface reaction heat release is less than heat losses, then little temperature rise and fuel conversion will be achieved and the bed will be in a "blowout" mode. For stable combustion the system must operate in a mode which avoids blowout.

In order to obtain maximum combustion efficiency, the overall fuel conversion within the bed must be considered. There must be sufficient residence time for the fuel/air mixture to diffuse and reach substantially complete reaction at the catalyst surface. Additionally, when the bulk gas-phase temperature is elevated sufficiently by these surface reactions, the gas-phase reactions will insure good fuel conversion efficiency. This is achieved by making the number of transfer units (TU) such that the bulk temperature of the reactants is elevated sufficiently to sustain a homogeneous flame speed equal to or greater than the desired system flow velocity.

The relative cell size for the individual bed segments is selected through analysis of the mass balance of the lean reactant at the wall of the cells; that is, the mass of lean reactant transported to the wall is equal to the mass of lean reactant consumed at the wall. For purposes of simplification of the analysis, the following assumptions are made: first that no conductive or radiative heat transfer occurs, second that the Lewis number is unity for all species, and third that the combustion reaction can be described by an Arrhenius law equation.

The mass balance (mass flux) equation is:

$$\dot{m} = Nu \frac{\rho \nu}{D} (K_E - K_W) = A K_W e^{-\Delta E/RTW},$$

where
- $\dot{m}$ = mass of lean reactant transported to and consumed at the wall, per unit area
- $Nu$ = Nusselt number for mass transfer (Sherwood number)
- $\rho$ = gas density
- $\nu$ = diffusion coefficient
- $D$ = diameter of one channel of monolith bed
- $K_E$ = mass fraction of lean reactant at boundary layer edge.
- $K_W$ = mass fraction of lean reactant at monolith bed
- $A$ = pre-exponential factor
- $\Delta E$ = activation energy
- $R$ = universal gas constant
- $T_W$ = temperature at monolith wall Each of the expressions for the mass flux can be shown graphically by plotting the mass flux as a function of the mass fraction of lean reactant at the wall. In the graph of FIG. 5 the two expressions are combined with curve 26 depicting the mass flux consumed at the wall ($\dot{m} = A K_W e^{-\Delta E/RTW}$) and curve 28 depicting the mass flux transported to the wall $$(\dot{m} = Nu \frac{\rho \nu}{D} (K_E - K_W)).$$

Solutions to set of simultaneous equations are repesented as intersections of the two curves. As shown in the combined curves there are generally three solutions that can exist: a hot stable solution at point 30, an unstable solution at point 32, and a cold stable solution at point 34. The assumed mass transport curve 28' depicts operation under typical self-ignition conditions. The blowout point can be considered as that value of $\dot{m}$ where the hot stable solution and the unstable solution coincide. This is depicted by the intersection of the assumed mass transport curve 28" at point 35 of the mass consumption curve 26. Any increase in mass throughput above this value will cause the combustion reaction to be extinguished, i.e., the reaction is "blown out." A large volume of $\dot{m}$ at blowout is desirable; it allows the monolith bed to operate at a large value of volumetric heat release rate, thereby minimizing the combustion volume required.

As shown on the graph, to avoid blowout the intercepts of the curves should be low, and preferably not so close to the point 35 such that minor fluctuation will cause blowout. At the same time, the curve should be sufficiently high so that there is adequate mass flow rate and product throughput in the combustor.

The mass balance curves in FIG. 5 are generalized; there are separate curves for the mass balance solutions to the individual cell segments of a particular monolith bed. The mass balance solutions provide a general method of determining cell size to achieve the objectives of the inventions which have previously been discussed. That is achieved (for the initial bed segment stable combustion without blowout, and with substantially all reactions being heterogenous), by using large diameter cells so that the intercept $$Nu \frac{\rho \nu}{D} K_E$$

is low.

It is desirable to obtain substantially complete combustion of the reactants, but at the same time use a relatively compact monolith bed. For a given bed size the use of large cells throughout would result in poor conversion of combustible products. Substantially complete conversion is achieved by providing a plurality of transfer units (TU). The length of each transfer unit is equal to $$\frac{Pr Re}{4 Nu} \cdot D$$

and thus for a given bed length a larger number of transfer units is achieved by minimizing the length of each transfer unit. This is achieved in the invention by use of mean diameters for the cells of the downstream bed segments 22,24 of a size which is progressively smaller than the cells in upstream segment 20. The smaller size cells also promote homogeneous reactions, which are helpful for full conversion. Blowout is avoided in these smaller cells because the preheating of the bulk flow by the upstream (larger) cells increases the curve 26 of FIG. 5 to (for example) curve 26'. Smaller diameters can then be employed without blowout.

The number of transfer units contributed by each segment can vary as required, and in the the illustrated embodiment at a velocity of 10 feet per second (STP) the upstream segment contributes ½ TU, the intermediate segment contributes ¼ TU and the downstream segment contributes ⅛ TU. The number of total segments in the bed could also be two, or the total could be four or more, as required. These segments may or may not be abutting, as desired.

The foregoing analysis is based upon simplified versions of mass balance equations. More complex analysis takes into account variables such as thermal conductivity of the bed, radiation, unequal diffusion, the effect of temperature on the diffusion coefficient, and tube entry effects. Such complex analysis has shown the qualitatively similar results for determining cell size as indicated by the simplified analysis.

As a specific example of the invention, the combustor 10 is formed with a monolith bed of a ceramic material having cells which are honeycomb-shaped in cross section. The bed has an overall length of 3 inches and a diameter of 3.6 inches. The three bed segments are of equal length and diameter. Upstream segment 20 is formed with a plurality of cells having a mean diameter of ¼″ and a 5% platinum coating as the catalyst. Intermediate segment 22 is formed with a plurality of cells having a mean diameter of 3/16 inches and a 1.5% platinum coating. Downstream segment 24 is formed with a plurality of cells having a mean diameter of ⅛ inches and a 1.0% platinum coating.

Another embodiment of the invention shown in FIG. 6 provides a combustor 36 which includes a monolith bed 38 enclosed by an insulating jacket 40. The bed is comprised of a packed bed of solid objects, such as small spheres packed together or cylinders in cross flow so that the interstitial spaces form the flow passages. The bed is subdivided into a plurality, such as two, of segments 42,44 with the spheres 46 in the upstream segment being larger than the spheres 48 in the downstream segment. This packed bed construction thereby results in large size interstitial spaces (equivalent to the cells of combustor 10) for the initial segment to achieve stable, heterogenous reactions at the bed entrance, and progressively smaller size spaces or "cells" for the downstream segment to provide a large number of overall transfer units for full conversion.

Examples of the use and operation of the invention are as follows:

A graded cell combustor having dimensions and honeycomb-shaped cells as described above for combustor 10 was operated with natural gas and propane fuel and air at one atmosphere pressure and approximately 600° F. preheat temperature. Bed temperatures of 2,500° F. to 2,600° F. were maintained for approximately one hour, with the maximum bed temperature of 2,710° F. maintained for approximately 15 minutes. Data from the high temperature operation is given in Table I.

While the foregoing embodiments are presently considered to be preferred, it is understood that numerous variations and modifications may be made therein by those skilled in the art and it is intended to cover in the appended claims all such variations and modifications that fall within the true spirit and scope of the invention.

TABLE I

| FUEL | TA, % | SV, hr$^{-1}$ | $m$fuel, lbm/hr | mair, lbm/hr | $T_{ph}$, °F. | $T_{bed}$, °F. |
|---|---|---|---|---|---|---|
| Natural Gas | 28 | 21,100 | 4.4 | 20.9 | 660 | 1,950 |
| Natural Gas | 28 | 21,400 | 4.4 | 21.5 | 460 | 1,940 |
| Natural Gas | 42 | 29,300 | 4.4 | 32.1 | 520 | 2,240 |
| Natural Gas | 42 | 29,200 | 4.4 | 32.1 | 524 | 2,250 |
| Natural Gas | 42 | 28,400 | 4.4 | 31.1 | 527 | 2,230 |
| Propane | 38 | 40,000 | 5.3 | 50.6 | 417 | 2,010 |
| Propane | 37 | 39,100 | 5.0 | 49.5 | 421 | 1,970 |
| Natural Gas | 40 | 37,800 | 5.8 | 39.8 | 634 | 2,400 |
| Natural Gas | 227 | 105,000 | 3.5 | 135.9 | 721 | 2,120 |
| Natural Gas | 217 | 97,600 | 3.4 | 127.4 | 738 | 2,350 |
| Natural Gas | 205 | 92,700 | 3.4 | 120.3 | 740 | 2,340 |
| Natural Gas | 196 | 92,500 | 3.6 | 120.0 | 730 | 2,360 |

What is claimed is:

1. A process for combusting fuel and oxidizer reactants comprising the steps of directing a mixture of of the reactants in a stream through a bed having a plurality of cells which form first passages having wall surfaces for combusting reactants in the stream, causing reactants in the stream to undergo heterogeneous combustion at the wall surfaces, said first cells having a given mean diameter of a size sufficiently large to cause the reactants to undergo self-sustaining combustion, thereafter directing the stream through at least one other monolith bed having a plurality of cells which form second passages having wall surfaces for combusting reactions in the stream, causing the reactants to undergo heterogeneous combustion at the wall surfaces of the second cells, said second and subsequent cells having a mean diameter which is less than the given diameter of the first or preceding cells but sufficiently large to cause the reactants to undergo self-sustained combustion and which is ultimately optimum for the heterogeneous combustion of from 60 to 95% of the reactants in the stream.

2. A process as in claim 1 in which the combined number of transfer units in the beds is such that the bulk temperature of the reactants is elevated sufficiently to sustain a homogenous flame speed equal to or greater than the desired system flow velocity.

3. A process for combusting fuel and oxidizer reactants comprising the steps of directing a mixture of the reactants through a first plurality of cells each formed by walls having a surface activity which causes heterogeneous reactions of the fuel and oxidizer, said first cells forming flow passages of cross-sectional size sufficiently large to cause the reactants to undergo self-sustained combustion, thereafter directing the stream through one or more additional plurality of cells each formed by walls having a surface activity for causing heterogeneous reactions, said additional cells forming flow passages of cross-sectional size less than the cross-sectional size of the first or preceding cells but sufficiently large to cause reactants to undergo self-sustained combustion whereby ultimately a plurality of transfer units are formed for heterogeneous combustion of the reactants flowing in the stream.

4. A process as in claim 3 in which reactants in the stream flowing through the additional plurality of cells are caused to undergo homogenous reaction by the heat released from the heterogeneous reaction whereby substantially complete conversion of the reactants is achieved with substantially no unreacted emissions remaining in the stream.

5. A process for the stable combustion of fuel and air at a substantially high volumetric heat release rate and with low emissions, including the steps of directing a mixture of the fuel and air in a stream through a first bed having a plurality of flow channels defined by surface active walls, with the flow of reactants through the channels forming boundary layers along the walls, said channels being sized with a mean diameter $D_1$ that corresponds to the hot stable solution from among the three potential solutions of a set of simultaneous equations whose simplified version is $$\dot{m} = Nu \frac{\rho\nu}{D} (K_E - K_W) \text{ and } \dot{m} = AK_W e^{-\Delta E/RTW}$$

where $\dot{m}$ = the mass of the lean reactant transported to the wall, per unit area; Nu = Nusselt number for mass transfer; $\rho$ = gas density; $\nu$ = diffusion coefficient; $K_E$ = mass fraction of the lean reactant at the boundary layer edge away from the wall; $K_W$ = mass fraction of the lean reactant at the wall; A = pre-exponential factor; $\Delta E$ = activation energy; R = universal gas constant; and $T_W$ = temperature at the wall, whereby the fuel and air undergo self-sustained heterogeneous reaction in the first bed, and thereafter directing the stream through one or more additional beds each having flow channels sized smaller than the preceding bed and each sized with a mean diameter that corresponds to a hot stable solution from among the three potential solutions of the set of simultaneous equations for substantially complete reaction of the fuel and air.

6. A process as in claim 5 in which the combined number of transfer units (NTU) of the first and additional beds is such that the bulk temperature of the reactants is elevated sufficiently to sustain a homogenous flame speed equal to or greater than the desired system flow velocity.

7. A combustor for reacting fuel and oxidizer reactants comprising the combination of bed means forming at least two surface active cellular segments through which a stream of the reactants is passed in series, the first of the segments in the series including means forming channels having a given cross-sectional size sufficient to cause the reactants to undergo self-sustained heterogeneous combustion at the channel walls, the downstream segments in the series including means forming channels having a mean cross-sectional size less than the size of the channels in the first or preceding segment with the number of combined transfer units of the monolith bed being sufficient to cause heterogeneous reaction of the reactants passing through the bed means.

8. A bed as in claim 7 in which the diameters of the channels in the downstream segment are sized so that the combined number of transfer units of the cellular segments is such that the bulk temperature of the reactants is elevated sufficiently to sustain a homogenous flame speed equal to or greater than the desired system flow velocity.

9. A monolith bed as in claim 7 in which the channels are defined by planar walls which extend along the direction of flow of the reactants.

10. A bed as in claim 7 in which the channels are defined by a bed of geometric-shaped objects having interstitial spaces forming the channels through which the reactants pass.

11. A bed as in claim 7 in which the channels in the first segment are sized with a mean diameter $D_1$ that corresponds to the hot stable solution from among the three potential solutions of a set of simultaneous equations whose simplified version is:

$$\dot{m} = Nu \frac{\rho\nu}{D} (K_E - K_W) \text{ and } \dot{m} = AK_W e^{-\Delta E/RTW}$$

where $\dot{m}$ = the mass of the lean reactant transported to the wall, per unit area; Nu = Nusselt number for mass transfer; $\rho$ = gas density; $\nu$ = diffusion coefficient; $K_E$ = mass fraction of the lean reactant at the boundary layer edge; $K_W$ = mass fraction of the lean reactant at the wall; A = pre-exponential factor; $\Delta E$ = activation energy; R = universal gas constant; and $T_W$ = temperature at the wall, whereby the fuel and air undergo self-sustained heterogeneous reaction in the first bed, and thereafter directing the stream through at least one additional bed each having flow channels smaller than the preceding bed and each sized with a mean diameter that corresponds to a hot stable solution from among the three potential solutions of the set of simultaneous equations.

* * * * *

UNITED STATES PATENT AND TRADEMARK OFFICE
CERTIFICATE OF CORRECTION

PATENT NO. : 4,154,568
DATED : May 15, 1979
INVENTOR(S) : Robert M. Kendall, John P. Kesselring It is certified that error appears in the above-identified patent and that said Letters Patent are hereby corrected as shown below:

Insert the following paragraph at Column 1, after line 3:

—The Invention described herein was made in the course of, or under, a contract with the Environmental Protection Agency.—

Signed and Sealed this

Eleventh Day of March 1980

[SEAL]

Attest:

SIDNEY A. DIAMOND

Attesting Officer          Commissioner of Patents and Trademarks

Disclaimer 4,154,568.—*Robert M. Kendall,* Sunnyvale; and *John P. Kesselring,* Mountain View, Calif. CATALYTIC COMBUSTION PROCESS AND APPARATUS. Patent dated May 15, 1979. Disclaimer filed March 17, 1983, by the assignee, *The United States Environmental Protection Agency.*

Hereby enters this disclaimer to claims 1, 3, 7 and 9 of said patent.

[*Official Gazette May 3, 1983.*]